United States Patent [19]
Ishikawa et al.

[11] Patent Number: 5,683,161
[45] Date of Patent: Nov. 4, 1997

[54] PROJECTING OPTICAL DEVICE

[75] Inventors: Takatoshi Ishikawa, Amagasaki; Soh Ohzawa, Toyonaka; Katsuhiro Takamoto, Nagaokakyo, all of Japan

[73] Assignee: Minolta Co., Ltd., Osaka, Japan

[21] Appl. No.: 653,747

[22] Filed: May 23, 1996

[30] Foreign Application Priority Data

May 25, 1995 [JP] Japan ................................. 7-126581

[51] Int. Cl.$^6$ ........................................... G03B 21/14
[52] U.S. Cl. ........................................... 353/94; 353/82
[58] Field of Search ........................... 353/71, 69, 70, 353/82, 21, 94; 359/618, 629, 637, 638, 449

[56] References Cited

U.S. PATENT DOCUMENTS

| | | | |
|---|---|---|---|
| 3,215,032 | 11/1965 | DeLang et al. | 353/82 |
| 5,192,961 | 3/1993 | Yoshida et al. | 353/66 |
| 5,293,188 | 3/1994 | Yoshida et al. | 353/66 |
| 5,477,280 | 12/1995 | Ko | 359/449 |
| 5,517,264 | 5/1996 | Sutton | 353/71 |

FOREIGN PATENT DOCUMENTS

| | | | |
|---|---|---|---|
| 1025523 | 1/1953 | France | 353/82 |
| 2257922 | 9/1974 | France | 353/82 |
| 58-4326 | 1/1983 | Japan . | |
| 61-2971 | 1/1986 | Japan . | |
| 04057013 | 2/1992 | Japan . | |

*Primary Examiner*—William Dowling
*Attorney, Agent, or Firm*—Burns, Doane, Swecker & Mathis, LLP

[57] ABSTRACT

A projecting optical device which simultaneously projects one object onto two or more different screens has a first screen, a second screen, a first projecting optical system which projects the object onto the first screen, and a second projecting optical system which projects the object onto the second screen and does not share an optical element with the first projecting optical system. A first base line connecting the center of the object to the center of the image projected on the first screen by the first optical system and a second base line connecting the center of the object to the center of the image projected on the second screen by the second optical system are not parallel to each other.

6 Claims, 9 Drawing Sheets

PROJECTING OPTICAL DEVICE

BACKGROUND OF THE INVENTION

1. Field of the Invention

The present invention pertains to a projecting optical device, and more particularly, to a projecting optical device that can simultaneously project one object onto two or more different image planes that do not exist on the same plane.

2. Description of the Related Art

There are situations where it is preferred to project one object onto two or more image planes that do not exist on the same plane. For example, where a meeting, etc. is held with one OHP (Over Head Projection) transparency being projected onto a screen, it is convenient if the same image can be simultaneously projected onto a monitoring screen located near the speaker or operator of the projector as well as on the main screen. Where the room in which the meeting, etc., is being held is large, it is also convenient for the participants of the meeting if the image can be projected onto two or more screens located at different positions.

For this purpose, projecting optical devices have been conventionally developed that can simultaneously project the an object (which may be provided by illuminating a transparency or by image display using an LCD, etc.) onto two or more screens that do not exist on the same plane.

In a conventional projecting optical device, a light separating means is placed between the projecting optical systems and the apparatus that provides the object, the light rays from the object to said member are converted into parallel light rays using a condenser lens, etc., the optical path of said light is divided and separated into different optical paths via the light separating means (a dichroic mirror, half-mirror, etc.), and the same object is simultaneously projected onto different screens using the construction described above.

FIG. 9 shows a representative example of a conventional projecting optical device. Using this projecting optical device, the light rays from object 91 to be projected onto image display device 90 are converted into parallel light rays by means of a collimating means (here, a collimator lens) 92 and these parallel light rays are guided to light separating means 93. While light separating means 93 reflects a portion of said parallel light rays by 90 degrees, it allows the rest of said light rays to advance straight ahead. The light from the image is divided into two in this way. The light reflected by light separating means 93 changes its optical path due to reflecting mirrors 941 and 942 and forms an image on first screen 96 via first projecting optical system 95. The light that is not reflected by light separating means 93 and advances straight ahead forms an image on second screen 99 via second projecting optical system 97 while changing its optical path due to reflecting mirror 98. In this way, one object 91 is simultaneously projected onto two different screens 96 and 99 that do not exist on the same plane.

However, in the conventional projecting optical device that simultaneously projects the same object onto two or more different screens that do not exist on the same plane, a light separating means is needed between the object and the projecting optical systems as described above. This is a light separating means similar to an RGB separating means for a liquid crystal projector, which means that an additional optical system such as an expensive prism element and condenser lens must be inserted between the projecting optical systems and the object. This results in a higher cost due to said additional optical system, as well as in an increase in the total length of the optical systems of the projecting optical device and in reduced freedom in the arrangement of the projecting optical systems, making it difficult to reduce the size of the entire device.

Light separating means 93 and an additional optical system such as collimator means 92 must also be located in the space in front of object 91 displayed on image display device 90 in the conventional device shown in FIG. 9. Therefore, the optical systems themselves become large and the device becomes expensive. Moreover, little freedom is available in the arrangement of screens 96 and 99, as the locations of the screens are determined by the reflecting means that bends the optical axes, such as reflecting mirrors 941 and 942, and in order to project the object onto any particular screens, expensive elements such as prisms are also required.

SUMMARY OF THE INVENTION

The object of the present invention is to provide a projecting optical device that simultaneously projects one object onto two or more different screens that do not exist on the same plane, said device being smaller than conventional devices of this type.

Another object of the present invention is to provide a projecting optical device that simultaneously projects one object onto two or more different screens that do not exist on the same plane, said device being less expensive than conventional devices of this type.

Yet another object of the present invention is to provide a projecting optical device that simultaneously projects one object onto two or more different screens that do not exist on the same plane, wherein freedom in the arrangement of the screens is increased.

In order to achieve said objects, the present invention is a projecting optical device that simultaneously projects one object onto two or more different screens, wherein said device is equipped with projecting optical systems for said respective screens to simultaneously project the object onto said screens, the base lines connecting the center of said object and the centers of the images on said screens via the respective projecting optical systems are not parallel to one another, said projecting optical systems not sharing optical elements that comprise said projecting optical systems.

The term 'base line' used above is, in other words, the central light ray that comes from the center of the object and passes through the projecting optical system.

In the projecting optical device of the present invention, the object is provided by means of an illumination device illuminating a transparency or through the display of the object image via an image display device. As the latter image display device, a device that displays images using an LCD (liquid crystal display), VFD (fluorescent character display tube), PDP (plasma display panel), CRT display, etc. may be used. The image display device may be a device that emits light by itself or a device that requires an outside light source.

In any event, when an illumination device is used in providing the object which is to be projected onto the screens, the illumination device is normally placed in front of the object (on the side of the normal line of the object) or behind the object.

The number of projecting optical systems may be any number so long as all the projecting optical systems can be placed in the space in front of the object. However, if tilt angle θ of the base line relative to the normal line of the object becomes too large, a large distribution occurs in the amount of light that comes from the object, which in turn causes a large distribution of illuminance on the screen. Therefore, it is preferred that tilt angle θ of the base line of each projecting optical system be 30 degrees or smaller.

In projecting the object onto the screens, mirrors that bend the base lines toward the screens can be used. It is also possible to have the mirror be a part of the projecting optical system and give it a curved configuration such that it may bend the optical axis to a large extent and furthermore perform aberration compensation.

Using the present invention, a projecting optical device that simultaneously projects one object onto two or more different screens that do not exist on the same plane and that may be made smaller than conventional devices of this type and may be provided at a less expensive price with increased freedom in the arrangement of screens can be provided.

These and other objects, advantages and features of the present invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Embodiments of the present invention are described below with reference to the drawings.

Figure 1:
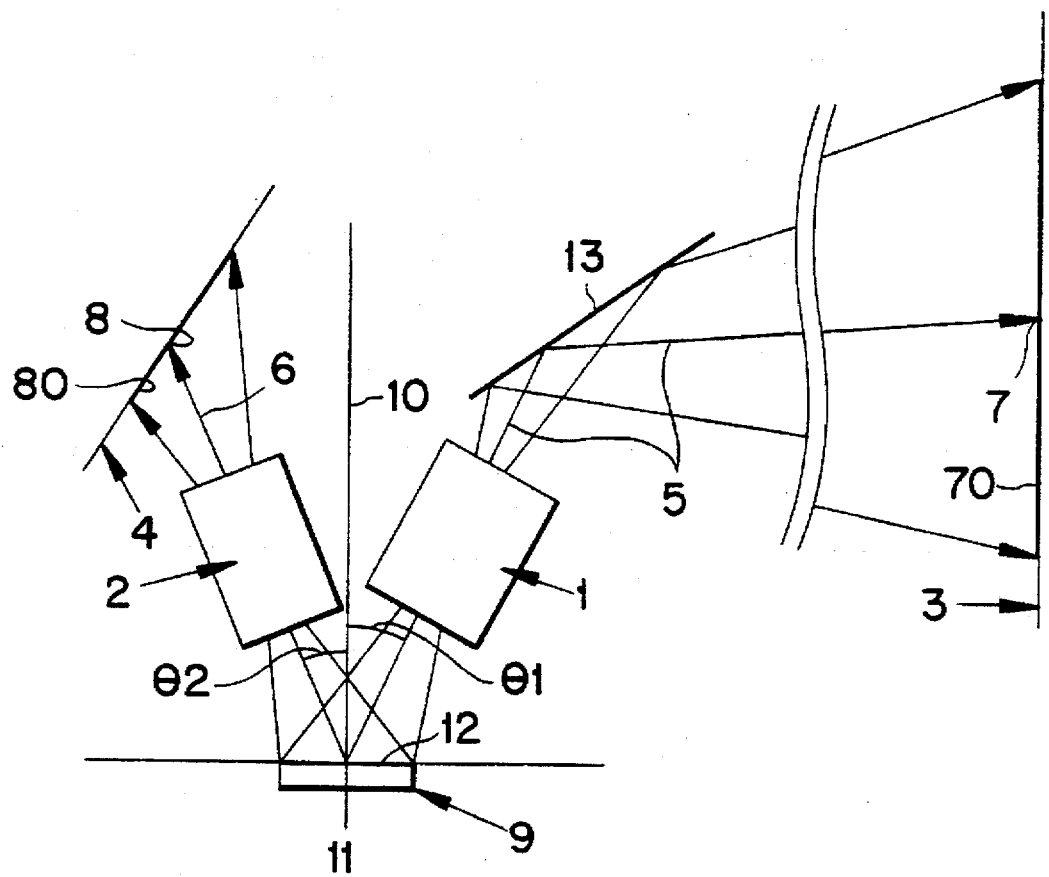
FIG. 1 shows the outline of the basic construction of embodiments of the projecting optical device of the present invention.

FIG. 1 shows the outline of the basic construction common to specific examples of the projecting optical device pertaining to the present invention, said specific examples being explained with reference to the drawings starting with FIG. 1.

In the projecting optical device shown in FIG. 1, object 12 to be projected onto screens 3 and 4 is provided by means of image display device 9 using an LCD display in which the object appears through illumination, although the means to provide said object is not limited to said image display device. The light source for this display device and other illumination systems are omitted in FIG. 1 but they are placed in the space on the side of normal line 10 of object 12 or on the opposite side.

This device is equipped with projecting optical system 1 to project the object onto screen 3 and projecting optical system 2 to project the object image onto screen 4, said screens 3 and 4 being different and not existing on the same plane. The projecting optical systems do not share any optical elements and each comprise independent optical elements.

These projecting optical systems 1 and 2 are placed in the space in front of object 12 such that base lines 5 and 6 connecting object center 11 and centers 7 and 8 of images 70 and 80 on screens 3 and 4 are tilted by θ1 and θ2, respectively, relative to normal line 10 drawn from object 12, said base lines 5 and 6 not being parallel with each other.

Tilt angles θ1 and θ2 of the base lines are both set to be 30 degrees or smaller such that there will not be a large distribution in the amount of light that enters the projecting optical systems from the object and therefore there will not be a large distribution of illuminance on the screens.

Flat mirror 13 in FIG. 1 is a means to bend base line 5 toward screen 3 and is not an absolutely essential element in projecting the object onto a given screen.

In this way, the image of one object 12 is simultaneously projected by means of the projecting optical systems 1 and 2 onto two different screens 3 and 4 that do not exist on the same plane.

As embodiments of the projecting optical device pertaining to the present invention, the following configurations are possible.

Figure 2:
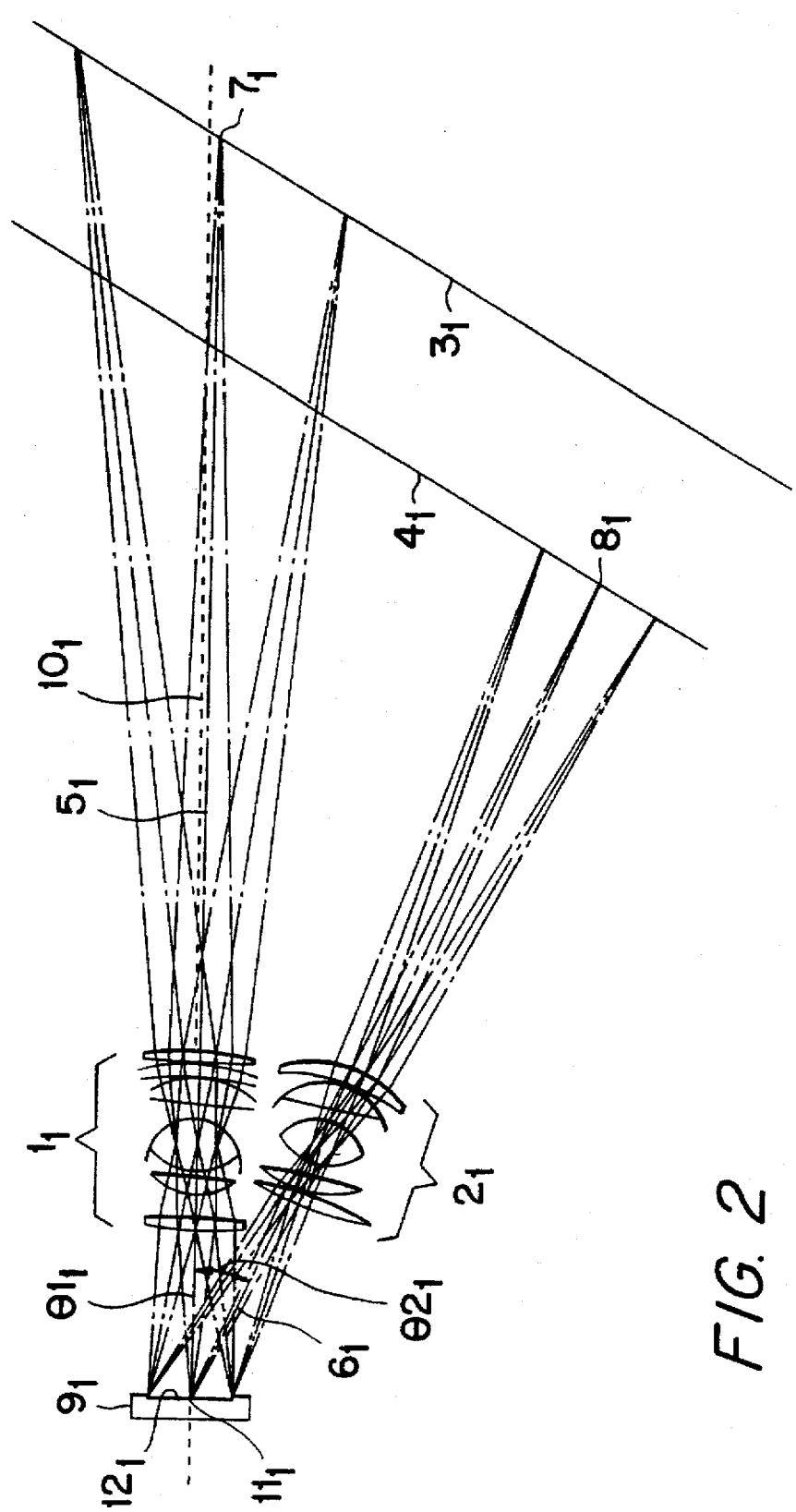
FIG. 2 shows important parts of a first embodiment of the present invention, including the projecting optical systems.
Figure 3:
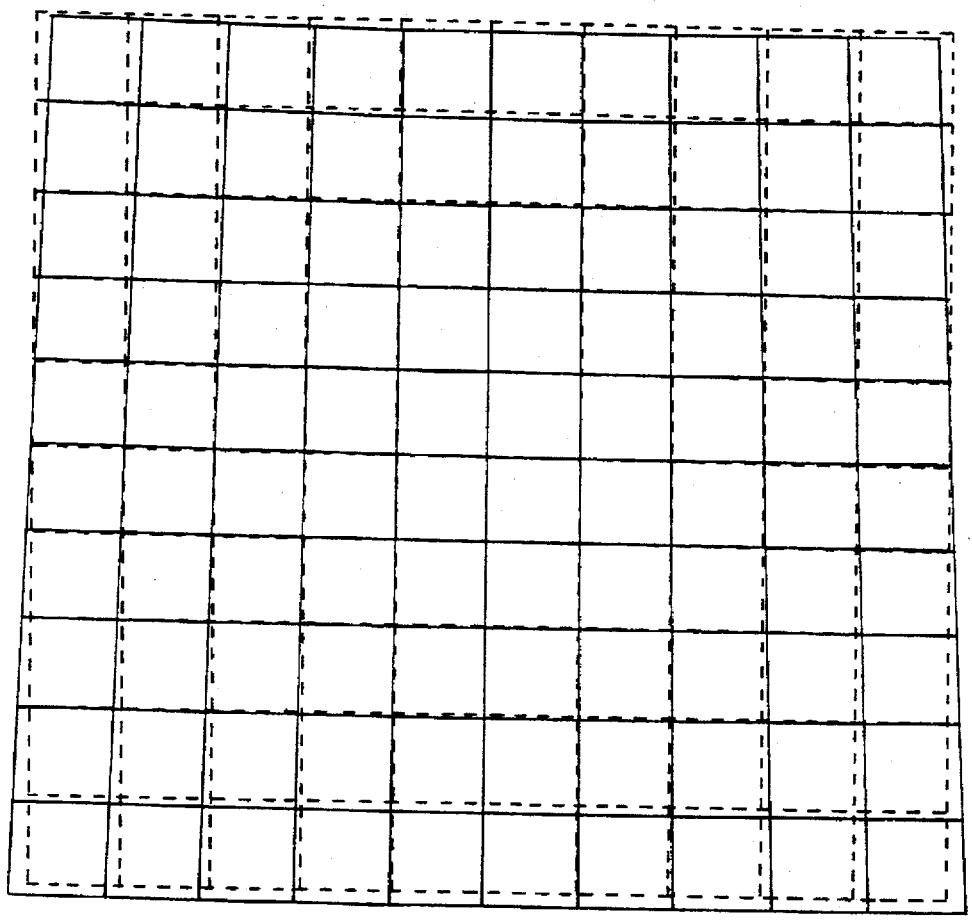
FIG. 3 shows the distortion that occurs with the second projecting optical system in the embodiment shown in FIG. 2.
Figure 4:
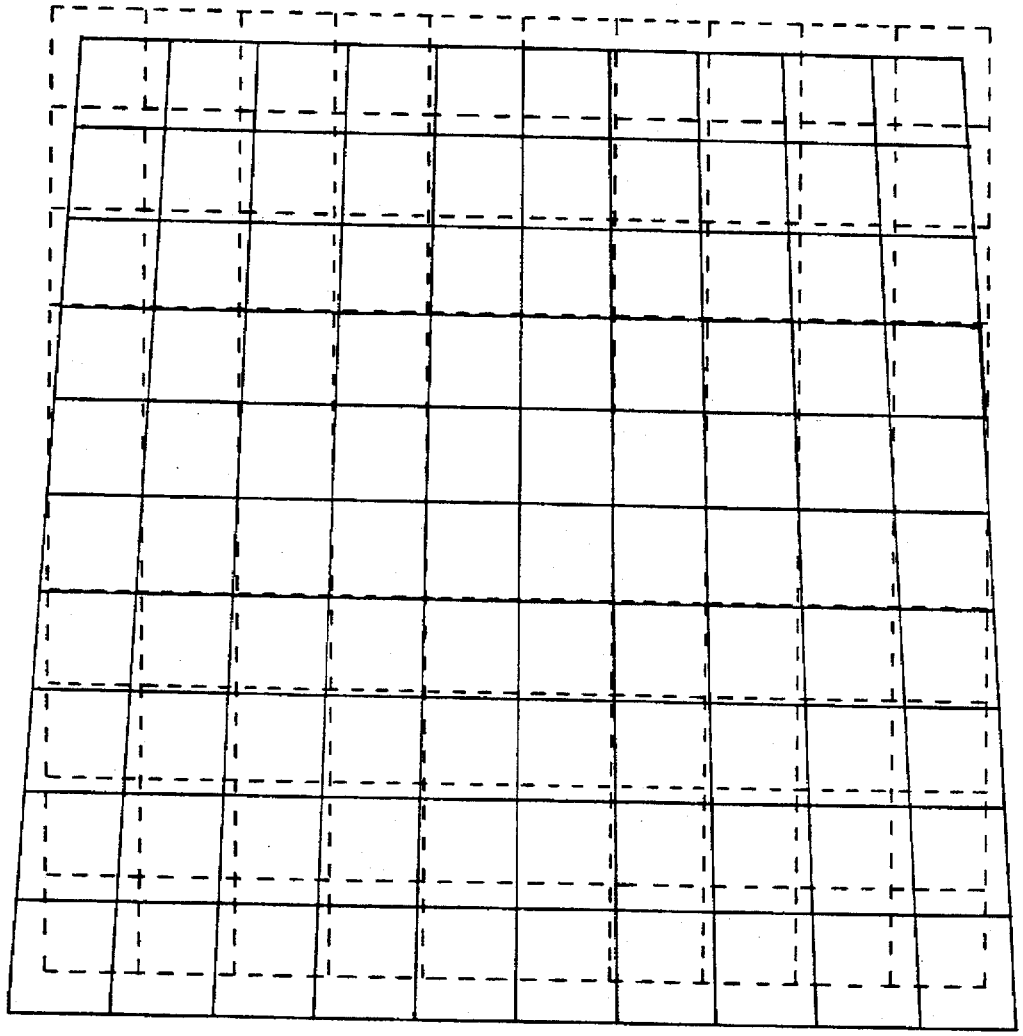
FIG. 4 shows the distortion that occurs when the second projecting optical system is a coaxial system in the embodiment shown in FIG. 2.

(1) A projecting optical device in which the two or more projecting optical systems include a projecting optical system that is placed such that its base line connecting the center of the object and the center of the image is tilted relative to the normal line of the object, wherein at least one lens or lens unit included in said projecting optical system is eccentric (see the embodiment shown in FIG. 2).

At least one lens or lens unit being 'eccentric' here means that the optical axis of the lens or lens unit does not coincide with the optical axes of other lenses or lens units. Incidentally, the term 'coaxial' used in the explanation below means that the optical axes of the lenses comprising the optical system coincide with one another.

Where the base line of the projecting optical system is tilted relative to the normal line of the object, if a coaxial projecting optical system is used, trapezoidal distortion occurs in the projected image in general. Consequently, in order to prevent trapezoidal distortion, it is possible to project the object onto the screen using a coaxial projecting optical system having a wide angle of view and using a part of the angle of view of said optical system, but this is limited to the case where the object and the screen for that projecting optical system are aligned parallel to each other. In addition, a coaxial optical system with a wide angle of view has large lens diameters in general, and since the edges of the angle of view are used, the number of lenses must be increased if sufficient compensation for aberrations is to be attempted.

On this point, with regard to the projecting optical system in which the base line is tilted relative to the normal line of the object such that the object may be projected to any given screen, distortion is corrected and a high quality image with little distortion can be projected onto the screen by making a part of the lens system eccentric, as described above.

Figure 5:
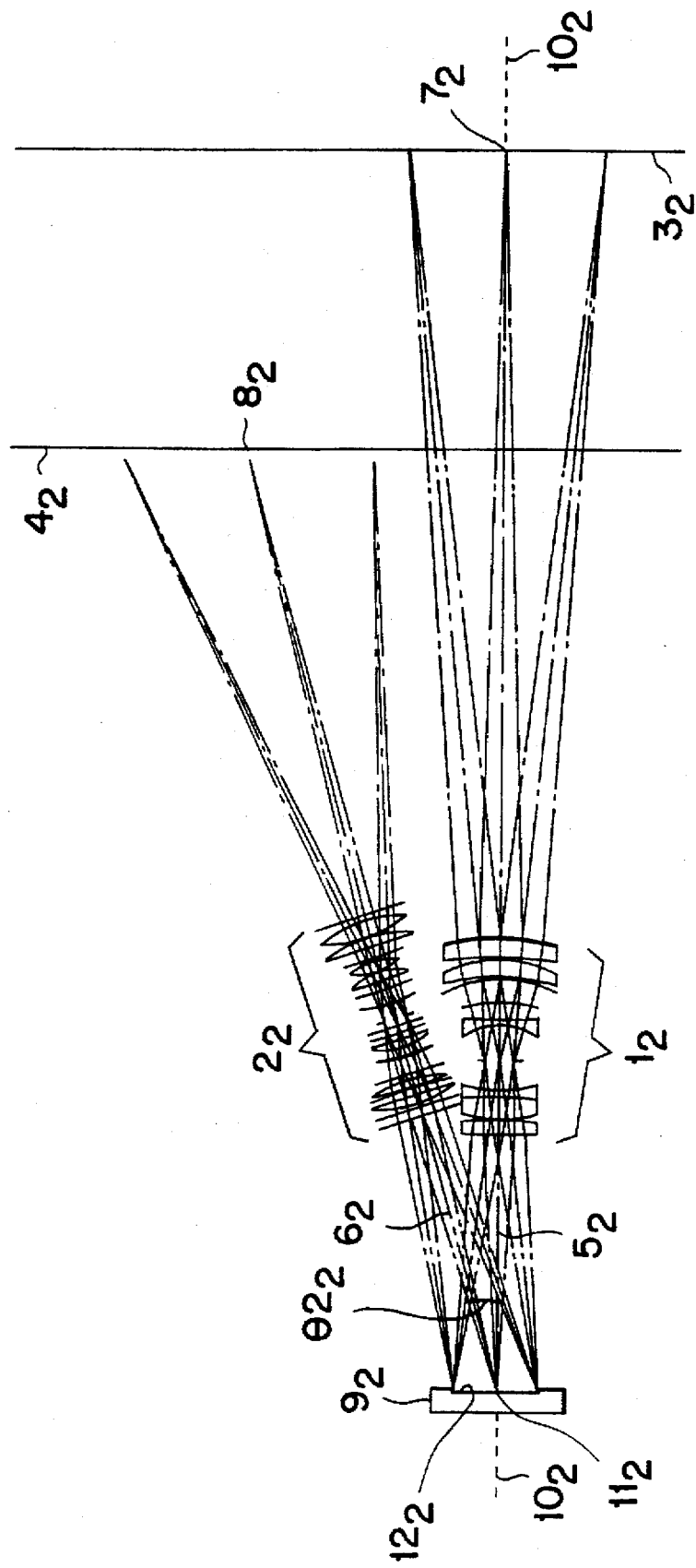
FIG. 5 shows important parts of another embodiment of the present invention.

(2) A projecting optical device in which at least one coaxial projecting optical system whose base line connecting the center of the object and the center of the image is parallel to the normal line of the object is included in the two or more projecting optical systems (see the embodiment shown in FIG. 5).

The projecting optical system in the projecting optical device of the present invention is either eccentric type or coaxial type when the normal line of the object and the base line are parallel. If the image plane is perpendicular to the base line, or in other words, if the screen is parallel to the object, it is preferred that the projecting optical system be of the coaxial type, and if the screen is not parallel to the object, it is preferred that the projecting optical system be of the eccentric type. This is one of the conditions required to prevent trapezoidal distortion of the projected image on the screen from occurring or to suppress said distortion. Where the object is projected onto a screen not parallel to the object, it is advantageous in terms of compensating for distortion for the projecting optical system to have eccentric lenses or lens units.

As long as the object and the screen are parallel to each other, arranging a coaxial projecting optical system along the normal line of the object means that the conventional optical system can be used as is and that an image that has high brightness, high magnification and high accuracy and that is little influenced by distortion and other aberrations can still be projected onto the screen parallel to the object. A combination of this coaxial projecting optical system and a projecting optical system whose base line is tilted relative to the normal line of the object makes it possible to provide a projecting optical device that effectively utilizes the amount of light from the object. This construction may be applied as a projecting optical device comprising a projector and a small monitoring screen.

Figure 6:
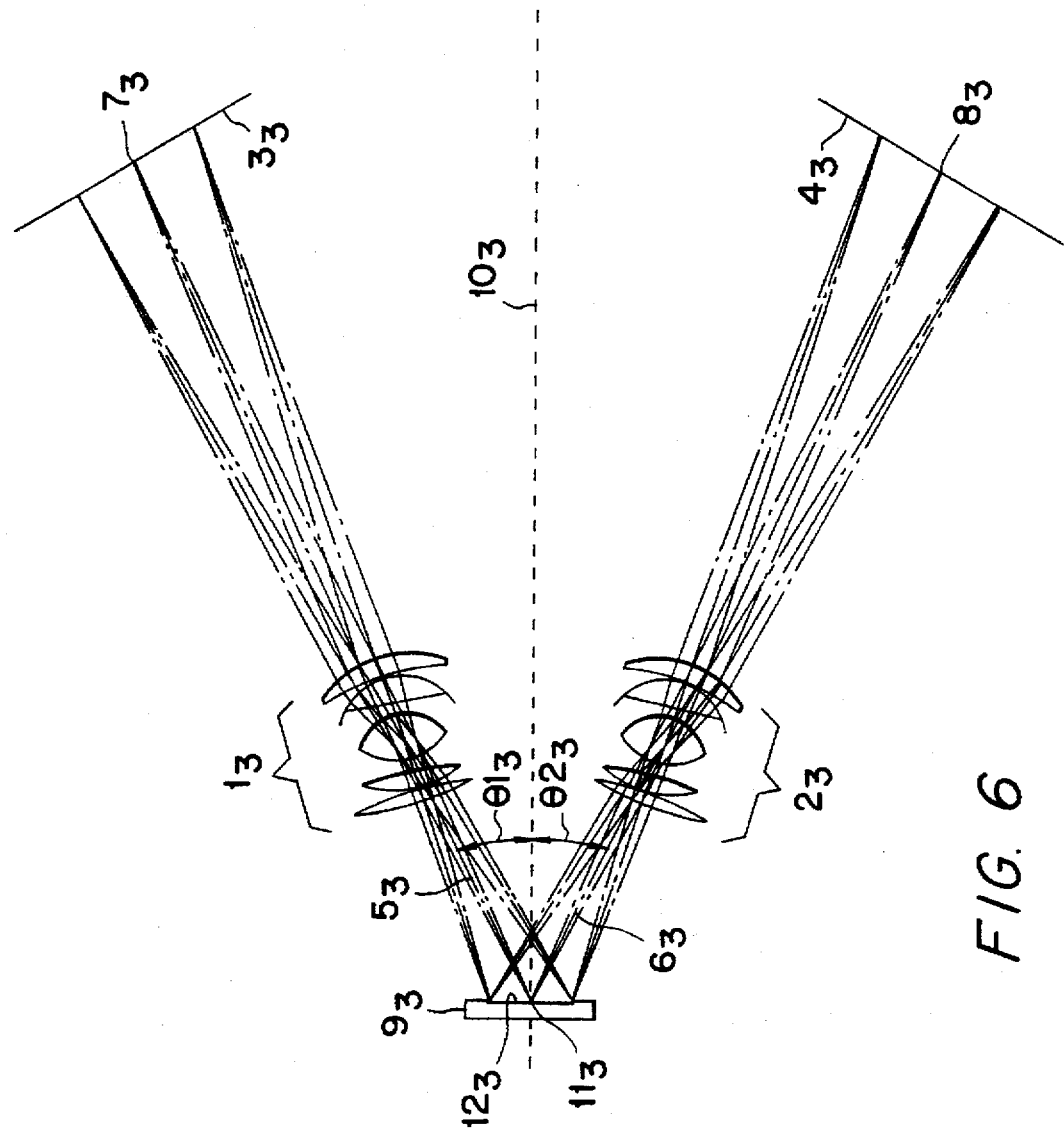
FIG. 6 shows important parts of yet another embodiment of the present invention.

(3) A projecting optical device in which two projecting optical systems are placed as said projecting optical systems such that their base lines are located in a symmetrical fashion across the normal line of the object (see the embodiment shown in FIG. 6).

Where two projecting optical systems are placed such that their base lines are located in a symmetrical fashion across the normal line of the object, projecting lens systems of the same type may be used, which reduces the cost of production of the projector accordingly.

If an illumination optical system is used for one projecting optical system while a projecting optical system (image sensing optical system) is used for the other, this construction may be applied in a stereo-microscope. In this application, loss of light and the occurrence of ghost images are suppressed and adjustment can be independently performed.

Figure 7:
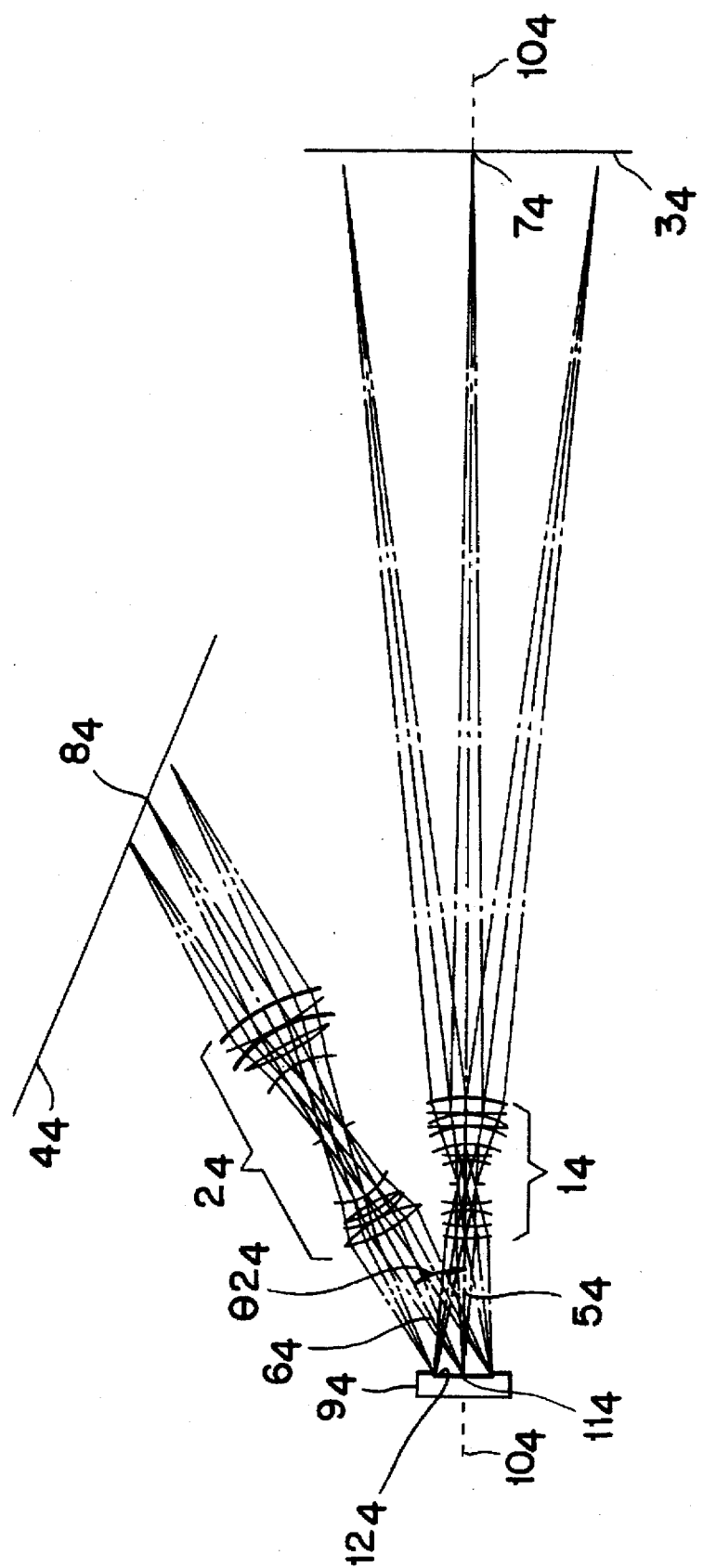
FIG. 7 shows important parts of yet another embodiment of the present invention.

(4) A projecting optical device in which the two or more projecting optical systems include a projecting optical system placed such that the base line connecting the center of the object and the center of the image is tilted relative to the normal line of the object, wherein at least one of said projecting optical systems is a coaxial afocal optical system or an optical system a part of which is an afocal system (see the embodiment shown in FIG. 7).

When a coaxial afocal system is used in the projecting optical system whose base line is tilted relative to the normal line of the object, even though the base line is tilted relative to the normal line of the object and the screen is not perpendicular to the base line, trapezoidal distortion does not take place. A low magnification afocal system is a lens system whose aberration may be easily corrected in an optical system whose base line is tilted relative to the normal line of the object, and by using the afocal system and an aberration correcting lens, such as a cylindrical lens, together in the tilted projecting optical system, an image having less aberration can be projected. The projecting optical system which is not tilted relative to the normal line of the object may also comprise an optical system including a non-eccentric afocal system, which can contribute to reducing the cost of manufacture.

The projecting optical devices of the embodiments pertaining to the present invention will now be explained with reference to the drawings starting with FIG. 2. In the explanation of the embodiment below, however, mirror 13 shown in FIG. 1 will be omitted. Members in the first through fourth embodiments that correspond to the respective members shown in FIG. 1 will be referred to using the same numbers as in FIG. 1 but with also subscript numbers 1 through 4.

First, the projecting optical device of the first embodiment shown in FIG. 2 will be explained. This projector is equipped with image display device $9_1$, first projecting optical system $1_1$, second projecting optical system $2_1$, first screen $3_1$, and second screen $4_1$ that does not exist on the same plane as first screen $3_1$ but exists on a different plane. These members are placed such that base line $5_1$ of first projecting optical system $1_1$ connecting object center $11_1$ and image center $7_1$ and base line $6_1$ of second projecting optical system $2_1$ connecting object center $11_1$ and image center $8_1$ are not aligned parallel to each other.

Angle $\theta1_1$ between base line $5_1$ of first projecting optical system $1_1$ and normal line $10_1$ of the display surface of display device $9_1$ (or in other words, object $12_1$ displayed on this plane) is 1.34 degrees and angle $\theta2_1$ between base line $6_1$ of second projecting optical system $2_1$ and normal line $10_1$ is 26.34 degrees.

Screens $3_1$ and $4_1$ are both tilted by approximately 30 degrees relative to the object display surface (or in other words, object $12_1$) of image display device $9_1$. Since the distance to the image forming plane is different for the two projecting optical systems, screens $3_1$ and $4_1$ do not exist on the same plane.

Projecting optical systems $1_1$ and $2_1$ include eccentric lens units in order to compensate for trapezoidal distortion that occurs due to the tilting of screens $3_1$ and $4_1$ relative to the display surface of display device $9_1$.

The projecting optical systems must be placed such that the light rays having a certain width that are emitted from each point on the object toward one projecting optical system are not hindered by the other projecting optical system.

Using the projecting optical device shown in FIG. 2, one object $12_1$ is simultaneously projected onto two different screens $3_1$ and $4_1$ with suppressed distortion.

The projecting optical device of the second embodiment shown in FIG. 5 is equipped with image display device $9_2$, first projecting optical system $1_2$, second projecting optical system $2_2$, first screen $3_2$ and second screen $4_2$ that does not exist on the same plane as the first screen. These members are placed such that base line $5_2$ of first projecting optical system $1_2$ connecting object center $11_2$ and image center $7_2$ and base line $6_2$ of second projecting optical system $2_2$ connecting object center $11_2$ and image center $8_2$ are not parallel to each other.

First projecting optical system $1_2$ is a coaxial projecting optical system, and normal line $10_2$ of object $12_2$ and base line $5_2$ are parallel to each other. Angle $\theta2_2$ between base line $6_2$ of second projecting optical system $2_2$ and normal line $10_2$ is 15 degrees.

Screen $3_2$ for first projecting optical system $1_2$ and the display surface of display device $9_2$ (object $12_2$) are aligned parallel to each other. A conventional coaxial optical system may be used as is for first projecting optical system $1_2$.

With regard to second projecting optical system $2_2$, while screen $4_2$ and the display surface of display device $9_2$ (object $12_2$) are aligned parallel to each other, since base line $6_2$ is tilted relative to normal line $10_2$ of the object, second projecting optical system $2_2$ comprises an eccentric optical system.

The one object $12_2$ is simultaneously projected onto two different screens $3_2$ and $4_2$ with suppressed distortion in this device as well.

The projecting optical device of the third embodiment shown in FIG. 6 is equipped with image display device $9_3$, first projecting optical system $1_3$, second projecting optical system $2_3$, first screen $3_3$ and second screen $4_3$ that does not exist on the same plane as the first screen. These members are placed such that base line $5_3$ of first projecting optical system $1_3$ connecting object center $11_3$ and image center $7_3$ and base line $6_3$ of second projecting optical system $2_3$ connecting object center $11_3$ and image center $8_3$ are not parallel to each other.

The lens data for the two projecting optical systems $1_3$ and $2_3$ is the same, the optical systems used for both of them being eccentric optical systems. Base lines $5_3$ and $6_3$ of the respective projecting optical systems are tilted by the same degrees on both sides of and relative to normal line $10_3$ of the display surface (object $12_3$) of display device $9_3$. Angle $\theta1_3$ ($\theta2_3$) relative to normal line $10_3$ is 26.34 degrees (−26.34 degrees).

The object $12_3$ is simultaneously projected onto two different screens $3_3$ and $4_3$ with suppressed distortion in this device as well.

The projecting optical device of the fourth embodiment shown in FIG. 7 is equipped with display device $9_4$, first projecting optical system $1_4$, second projecting optical system $2_4$, first screen $3_4$ and second screen $4_4$ that does not exist on the same plane as the first screen. These members are placed such that base line $5_4$ of first projecting optical system $1_4$ connecting object center $11_4$ and image center $7_4$ and base line $6_4$ of second projecting optical system $2_4$ connecting object center $11_4$ and image center $8_4$ are not parallel to each other.

First projecting optical system $1_4$ is a coaxial projecting optical system, and normal line $10_4$ of the display surface of display device $9_4$ (object $12_4$) and base line $5_4$ are parallel to each other. Screen $3_4$ is aligned parallel to object $12_4$.

Figure 8:
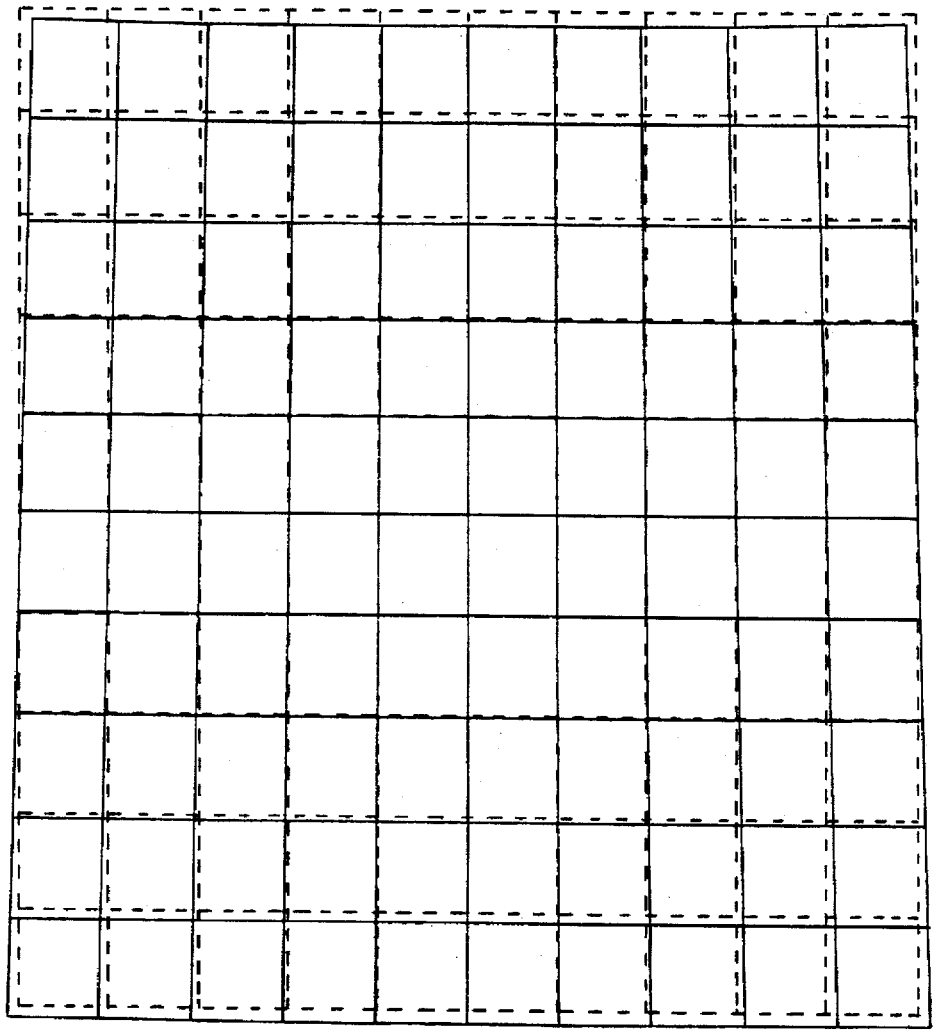
FIG. 8 shows the distortion that occurs with the second projecting optical system in the embodiment shown in FIG. 7.
Figure 9:
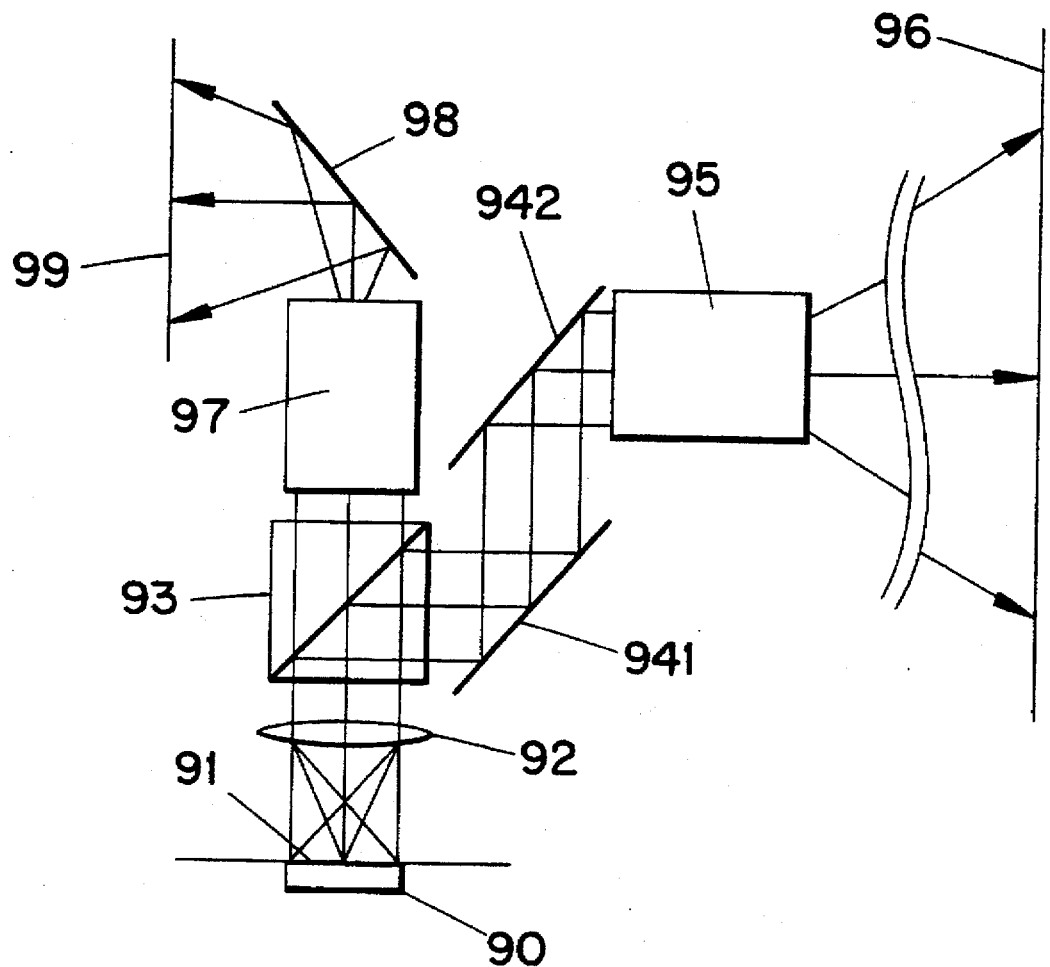
FIG. 9 shows the outline construction of a conventional device.

Second projecting optical system $2_4$ is a coaxial afocal system. Angle $\theta2_4$ between base line $6_4$ of the second projecting optical system and normal line $10_4$ of the display surface of display device $9_4$ (object $12_4$) is 30 degrees. Second screen $4_4$ is tilted by 68 degrees relative to object $12_4$. FIG. 8 shows the distortion that occurs with second projecting optical system $2_4$ of the fourth embodiment of the present invention. As can be seen from this drawing, where a coaxial optical system is placed in a tilted fashion, if the system is an afocal system, distortion can be reduced.

Therefore, the object $12_4$ is simultaneously projected onto two different screens $3_4$ and $4_4$ with suppressed distortion in this device as well.

Although mirror 13 shown in FIG. 1 is not shown in the first through fourth embodiments explained above, where such a mirror is used, the base line should coincide with a line connecting the center of the object and the center of light rays on the mirror.

As explained above, using the projecting optical device of the present invention, the light rays from the object may be directly led into projecting optical systems without the use of a light separating means that has conventionally been used, i.e., by relaying the light rays, and said light rays from the object may be simultaneously projected onto two or more different screens that do not exist on the same plane by placing said projecting optical systems in the space in front of the one object in such a way that the base lines connecting the center of the object and the centers of the respective images are not parallel to each other.

The projecting optical device pertaining to the present invention can be provided for less cost to the extent that it does not require an expensive additional optical system such as a light separating means. In addition, because an additional optical system such as a light separating means is not needed, the total length of the entire optical systems can be reduced. Since the projecting optical systems can be placed in a tilted fashion, the space between the object and the projecting optical systems can be effectively utilized, and the increased freedom in the arrangement of the optical system members helps reduce the size of the entire device, which also increases freedom in design. Furthermore, the placement of the screens can be freely determined depending on the projecting optical systems and reflecting mirrors that are placed on the image side of the projecting optical system. This translates into increased freedom in the arrangement of the screens.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A projecting optical device which simultaneously projects one object onto two or more different screens comprising:

a first screen;

a second screen;

a first projecting optical system which projects the object onto said first screen and has an optical element; and a second projecting optical system which projects the object onto said second screen and has an optical element other than the optical element of the first projecting optical system, wherein said first optical system does not share any portion of its optical path with said second optical system.

2. A projecting optical device as claimed in claim 1, wherein a first base line connects the center of the object and the center of the image projected on the first screen by said first optical system, said first base line being inclined relative to the normal line of the object, and at least one lens included in said first projecting optical system is eccentric.

3. A projecting optical device as claimed in claim 1, wherein said first projecting optical system is a coaxial optical system whose base line connecting the center of the object and the center of the image projected on the first screen by said first optical system is parallel to the normal line of the object.

4. A projecting optical device as claimed in claim 1, wherein a first base line connecting the center of the object and the center of the image projected on said first screen by said first optical system and a second base line connecting the center of the object and the center of the image projected on said second screen by said second optical system are symmetric with respect to the normal line of the object.

5. A projecting optical device as claimed in claim 1, wherein a first base line connecting the center of the object and the center of the image projected on said first screen by said first optical system is inclined relative to the normal line of the object, and said first projecting optical system is an optical system including an afocal optical system.

6. A projecting optical device as claimed in claim 1, wherein a first base line connecting the center of the object and the center of the image projected on said first screen by said first optical system is inclined relative to the normal line of the object, and said first projecting optical system is a coaxial afocal optical system.

* * * * *